(12) United States Patent
Jin et al.

(10) Patent No.: US 9,165,373 B2
(45) Date of Patent: Oct. 20, 2015

(54) STATISTICS OF NEAREST NEIGHBOR FIELDS

(71) Applicant: Adobe Systems Incorporated, San Jose, CA (US)

(72) Inventors: Hailin Jin, San Jose, CA (US); Zhuoyuan Chen, Evanston, IL (US); Zhe Lin, Fremont, CA (US); Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 226 days.

(21) Appl. No.: 13/794,219

(22) Filed: Mar. 11, 2013

(65) Prior Publication Data

US 2014/0254881 A1 Sep. 11, 2014

(51) Int. Cl.
*G06K 9/00* (2006.01)
*G06T 7/20* (2006.01)

(52) U.S. Cl.
CPC .............. *G06T 7/2013* (2013.01); *G06T 7/204* (2013.01); *G06T 7/2006* (2013.01)

(58) Field of Classification Search
None
See application file for complete search history.

(56) References Cited

U.S. PATENT DOCUMENTS

| | | | |
|---|---|---|---|
| 5,351,095 A * | 9/1994 | Kerdranvat | 348/699 |
| 5,729,008 A | 3/1998 | Blalock et al. | |
| 5,749,073 A | 5/1998 | Slaney | |
| 7,711,180 B2 | 5/2010 | Ito et al. | |
| 8,205,148 B1 | 6/2012 | Sharpe et al. | |
| 8,290,294 B2 | 10/2012 | Kopf et al. | |
| 8,340,461 B2 | 12/2012 | Sun et al. | |
| 8,346,751 B1 | 1/2013 | Jin et al. | |
| 8,588,551 B2 | 11/2013 | Joshi et al. | |
| 8,675,962 B2 | 3/2014 | Mori et al. | |
| 9,025,822 B2 | 5/2015 | Jin et al. | |
| 9,031,345 B2 | 5/2015 | Jin et al. | |
| 2004/0218834 A1 | 11/2004 | Bishop et al. | |
| 2005/0069207 A1 | 3/2005 | Zakrzewski et al. | |
| 2006/0147087 A1 * | 7/2006 | Goncalves et al. | 382/103 |
| 2007/0242900 A1 * | 10/2007 | Chen et al. | 382/294 |
| 2007/0273653 A1 | 11/2007 | Chen et al. | |
| 2007/0286497 A1 | 12/2007 | Podilchuk | |
| 2008/0278584 A1 * | 11/2008 | Shih et al. | 348/169 |
| 2009/0110076 A1 * | 4/2009 | Chen | 375/240.16 |
| 2009/0297059 A1 | 12/2009 | Lee et al. | |

(Continued)

OTHER PUBLICATIONS

Brox et al (NPL: "Large Displacement Optical Flow: Descriptor Matching in Variational Motion Estimation", IEEE, 0162-8828/10/, 2010.*

(Continued)

*Primary Examiner* — Bhavesh Mehta
*Assistant Examiner* — Oneal R Mistry
(74) *Attorney, Agent, or Firm* — Wolfe-SBMC (57) ABSTRACT

In embodiments of statistics of nearest neighbor fields, matching patches of a nearest neighbor field can be determined at image grid locations of a first digital image and a second digital image. A motion field can then be determined based on motion data of the matching patches. Predominant motion components of the motion field can be determined based on statistics of the motion data to generate a final motion field. The predominant motion components correspond to a motion of objects as represented by a displacement between the first and second digital images. One of the predominant motion components can then be assigned to each of the matching patches to optimize the final motion field of the matching patches.

20 Claims, 6 Drawing Sheets

(56) References Cited

U.S. PATENT DOCUMENTS

| | | | |
|---|---|---|---|
| 2010/0128789 A1* | 5/2010 | Sole et al. | 375/240.16 |
| 2010/0272311 A1* | 10/2010 | Nir et al. | 382/100 |
| 2011/0026596 A1 | 2/2011 | Hong | |
| 2011/0043603 A1 | 2/2011 | Schechner et al. | |
| 2011/0170784 A1* | 7/2011 | Tanaka et al. | 382/195 |
| 2012/0027295 A1* | 2/2012 | Shao | 382/170 |
| 2012/0105728 A1 | 5/2012 | Liu | |
| 2012/0134574 A1 | 5/2012 | Takahashi et al. | |
| 2012/0151320 A1 | 6/2012 | McClements, IV | |
| 2013/0136364 A1 | 5/2013 | Kobayashi | |
| 2013/0230247 A1* | 9/2013 | Schlosser et al. | 382/180 |
| 2013/0235201 A1 | 9/2013 | Kiyohara et al. | |
| 2014/0133675 A1 | 5/2014 | King et al. | |
| 2014/0205141 A1 | 7/2014 | Gao et al. | |
| 2014/0254882 A1 | 9/2014 | Jin | |
| 2014/0254933 A1 | 9/2014 | Jin | |
| 2014/0254943 A1 | 9/2014 | Jin | |

OTHER PUBLICATIONS

"Non-Final Office Action", U.S. Appl. No. 13/794,408, Sep. 10, 2014, 14 pages.

"Non-Final Office Action", U.S. Appl. No. 13/794,125, Oct. 24, 2014, 19 pages.

Zhang, et al.,' "Video Dehazing with Spatial and Temporal Coherence", The Visual Computer: International Journal of Computer Graphics—CGI'2011 Conference, vol. 27, Issue 6-8, Apr. 20, 2011, 9 pages.

Barnes, et al.,' "PatchMatch: A Randomized Correspondence Algorithm for Structural Image Editing", ACM SIGGRAPH 2009 Papers (New Orleans, Louisiana, Aug. 3-7, 2009) Aug. 3, 2009, 11 pages.

Barnes, et al.,' "The Generalized PatchMatch Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010,Sep. 2010, 14 pages.

Brox, et al.,' "Large Displacement Optical Flow: Descriptor Matching in Variational Motion Estimation", IEEE Transactions on Pattern Analysis and Machine Intelligence, 2010, 2011, 14 pages.

Fattal, "Single Image Dehazing", presented at the ACM SIGGRAPH, Los Angeles, California, 2008., 2008, 9 pages.

He, et al.,' "Computing Nearest-Neighbor Fields via Propagation-Assisted KD-Trees", CVPR 2012, 2012, 8 pages.

He, et al.,' "Single Image Haze Removal Using Dark Channel Prior", In Computer Vision and Pattern Recognition, IEEE Conference on, 2009, 2009, 8 pages.

He, et al.,' "Statistics of Patch Offsets for Image Completion", ECCV 2012, 2012, 14 pages.

Korman, et al.,' "Coherency Sensitive Hashing", ICCV 2011, 2011, 8 pages.

Olonetsky, et al.,' "TreeCANN—k-d tree Coherence Approximate Nearest Neighbor algorithm", European Conference on Computer Vision, 2012, 2012, 14 pages.

Xu, et al.,' "Motion Detail Preserving Optical Flow Estimation", IEEE Transactions on Pattern Analysis and Machine Intelligence, 34(9), 2012, 2012, 8 pages.

"Corrected Notice of Allowance", U.S. Appl. No. 13/794,125, Apr. 9, 2015, 2 pages.

"Non-Final Office Action", U.S. Appl. No. 13/675,844, Dec. 19, 2014, 10 pages.

"Non-Final Office Action", U.S. Appl. No. 13/794,300, Mar. 11, 2015, 18 pages.

"Notice of Allowance", U.S. Appl. No. 13/794,125, Jan. 30, 2015, 7 pages.

"Notice of Allowance", U.S. Appl. No. 13/794,408, Feb. 4, 2015, 7 pages.

"Supplemental Notice of Allowance", U.S. Appl. No. 13/794,408, Apr. 17, 2015, 2 pages.

Dong, et al.,' "Adaptive Object Detection and Visibility Improvement in Foggy Image", Journal of Multimedia, vol. 6, No. 1 (2011), Feb. 14, 2011, 8 pages.

Wu, "Fish Detection in Underwater Video of Benthic Habitats in Virgin Islands", University of Miami, May 29, 2012, 72 pages.

"Notice of Allowance", U.S. Appl. No. 13/794,300, May 4, 2015, 8 pages.

* cited by examiner

STATISTICS OF NEAREST NEIGHBOR FIELDS

BACKGROUND

Matching patches between two images, or between regions of the images, is also referred to as computing a nearest neighbor field and is a common technique used for image processing and computer graphics applications. Patches of an image may be compared as each pixel of the image, or may be a larger region of the image that includes a grid of multiple pixels. One technique for determining matching patches between two images is to exhaustively search for the best matching patch in one of the images for every patch in the other image. Although this technique is a simple algorithm, it is computationally expensive and time-consuming.

There are other more efficient algorithms that can be utilized to speed up the matching process, such as by utilizing a spatial constraint that adjacent patches in one image tend to have the same spatial relationship with the matching patches in the other image. However, these algorithms are directed to reconstructing one image from the other and often produce patch matches that are spatially incoherent, with the resulting nearest neighbor fields being based on reconstruction errors. Conventional techniques and algorithms to compute nearest neighbor fields between images do not enforce spatial coherency of the matching patches, and may not match a patch in one image to the respective, same patch in another image. For example, a white color patch in one image may be matched to any number of white color patches in another image without maintaining the spatial coherency of the actual corresponding patches in the two images.

Optical flow is the problem of inferring the apparent motion between images, and conventional algorithms for optical flow are utilized to compute a motion field, such as for optical flow registration, which is useful for image tracking, motion segmentation, and other motion processing applications. A nearest neighbor field typically provides only a very noisy estimate of the true optical flow field for the images. A motion field can be computed between two images, where the direction and magnitude of optic flow at each location is represented by the direction and length of arrows in the motion field. A motion determination between images can be utilized to track object motion, such as in video frames. For example, in a robotics application, cameras may capture two or more separate images of a scene and/or subject from slightly different perspectives and combine the separate images into one image to reduce or eliminate noise in the images. The noise effect will be different in each of the images, and the combined image is a smoothed combination of the separate images that reduces or eliminates the noise effect of each image.

Although optical flow algorithms can enforce the spatial coherency of pixels and/or patches between images, the conventional algorithms assume that the pixel motion of objects (e.g., object displacement) from one image to the next is very small. Further, optic flow registration algorithms that extract feature points do not provide a dense motion field of the images. Additionally, the conventional algorithms often produce incorrect results because they are initialized to start from an initial motion field that is typically set to zero everywhere, and therefore cannot account for a large motion between two images.

SUMMARY

This Summary introduces features and concepts of statistics of nearest neighbor fields, which is further described below in the Detailed Description and/or shown in the Figures. This Summary should not be considered to describe essential features of the claimed subject matter, nor used to determine or limit the scope of the claimed subject matter.

Statistics of nearest neighbor fields is described. In embodiments, matching patches of a nearest neighbor field can be determined at image grid locations of a first digital image and a second digital image. A motion field can then be determined based on motion data of the matching patches. Predominant motion components of the motion field can be determined based on statistics of the motion data to generate a final motion field. The predominant motion components correspond to a motion of objects as represented by a displacement between the first and second digital images. One of the predominant motion components can then be assigned to each of the matching patches to optimize the final motion field of the matching patches.

In embodiments, a histogram can be computed based on the statistics of the motion data of all of the motion components in the motion field, and the predominant motion components are selected based on peaks of the histogram. Alternatively or in addition, the predominant motion components can be determined based in part on a factor of spatial connectivity that corresponds to a spatial relationship between the predominant motion components. The predominant motion components may also be determined based in part on a clustering of the motion components in the motion field. Alternatively or in addition, the predominant motion components may be determined based in part on a projected motion constraint that represents a projected (e.g., expected or natural) motion of the objects between the first and second digital images. The motion data of matching patches that do not represent the projected motion of the objects can be disregarded.

In embodiments, scale invariant feature transform (SIFT) features that match between the two digital images can be determined, and the predominant motion components are determined based in part on the matching SIFT features. Additionally, high-order motion components that have a transformative component of the motion can be determined, and the predominant motion components include one or more the high-order motion components.

BRIEF DESCRIPTION OF THE DRAWINGS

Embodiments of statistics of nearest neighbor fields are described with reference to the following Figures. The same numbers may be used throughout to reference like features and components that are shown in the Figures.

DETAILED DESCRIPTION

Embodiments of statistics of nearest neighbor fields are described and may be implemented by any type of device that supports image processing, such as a computer, a server, or other type of processing device. An image processing application includes a nearest neighbor field algorithm to determine initial matching patches of a nearest neighbor field for two digital images. The initial matching patches between the two images can then be used to compute a motion field between the two images. Unlike the conventional optic flow algorithms noted above that do not account for large motion between two images, and that are initialized to start from a zero motion field, the initial matching patches of the nearest neighbor field for the two digital images are not constrained by the magnitude of the motion between the two images.

A motion optimization algorithm of the image processing application can then determine predominant motion components of the motion field based on statistics of the motion data. The motion optimization algorithm also assigns one of the predominant motion components to each of the matching patches to optimize a final motion field of the matching patches. The algorithm utilizes the statistics of a motion field between two digital images, as determined from a nearest neighbor field for the images, to generate a spatially coherent nearest neighbor field.

The statistics of the motion field between two digital images can be simple and uncomplicated once determined. Further, the statistics are sparsely distributed and the entire motion field can be well described based on a few predominant motion components determined from the motion field. Utilizing the statistics of a motion field between two digital images to generate a spatially coherent nearest neighbor field is also more robust with respect to ambiguous patch matching, and noise that may be inherent in the digital images can be eliminated when the predominant motion components are determined.

While features and concepts of statistics of nearest neighbor fields can be implemented in any number of different devices, systems, networks, environments, and/or configurations, embodiments of statistics of nearest neighbor fields are described in the context of the following example devices, systems, and methods.

Figure 1:
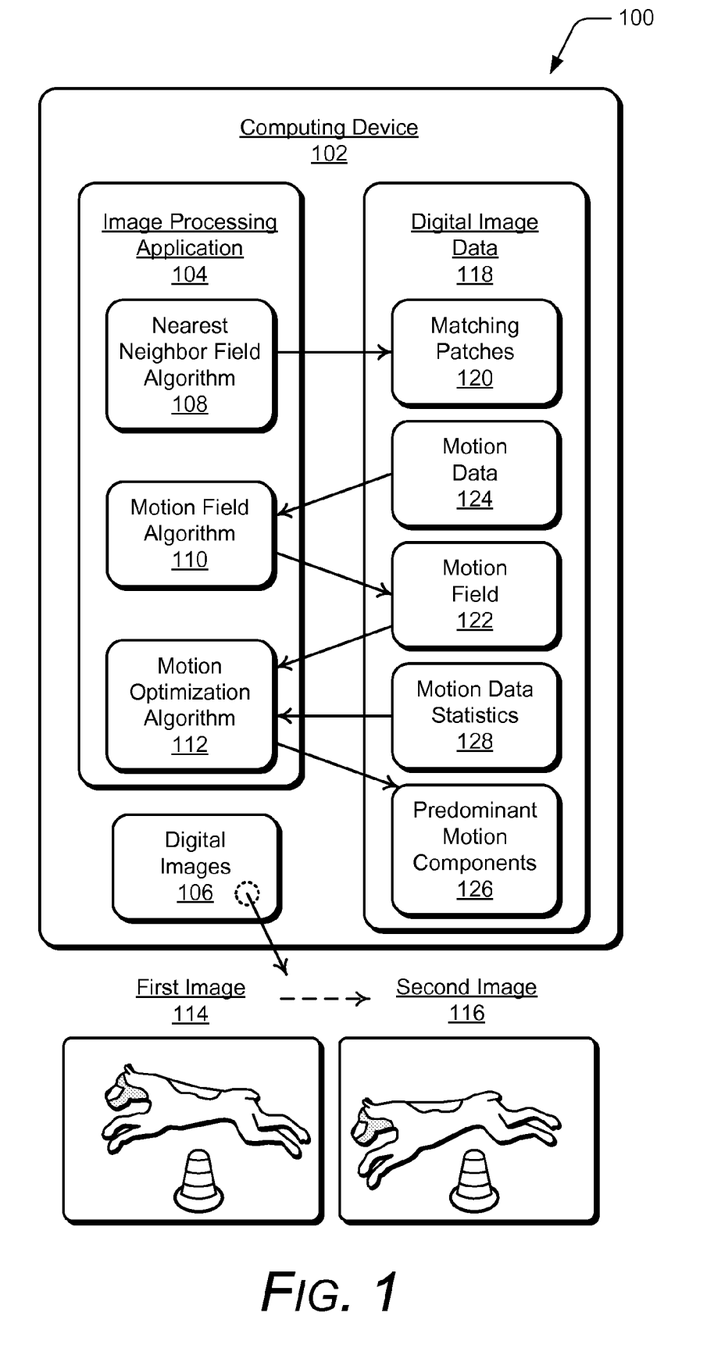
FIG. 1 illustrates an example system in which embodiments of statistics of nearest neighbor fields can be implemented.

FIG. 1 illustrates an example system 100 in which embodiments of statistics of nearest neighbor fields can be implemented. The system 100 includes an example computing device 102 that includes an image processing application 104, which may implement various algorithms to generate nearest neighbor fields that are spatially coherent when processing digital images 106. The example device may be any type of computer and/or processing device, and can be implemented with various components, such as a processing system and memory, as well as with any number and combination of differing components as further described with reference to the example device shown in FIG. 6.

In this example system, the image processing application 104 includes a nearest neighbor field algorithm 108, a motion field algorithm 110, and a motion optimization algorithm 112 to implement embodiments for statistics of nearest neighbor fields. Although shown and described as separate algorithms of the image processing application, any one or more of the algorithms may be implemented together and/or independent of the image processing application. Alternatively, the image processing application 104 may be implemented without the algorithms, yet generally be implemented to perform the functions and operations of the algorithms.

The image processing application 104 and the various algorithms can be implemented as a software application, modules, or components for image processing, and can be maintained at the computing device 102 as executable instructions that are stored on computer-readable storage media, such as any suitable memory device or electronic data storage. Additionally, the image processing application 104 and algorithms can be executed with a processing system of the computing device 102 to implement embodiments for statistics of nearest neighbor fields.

The digital images 106 can include any type of images, such as two video frames that are consecutive or close together in time. Consecutive images will typically include subject matter that overlaps, such as the background of the images, and objects that may be moving in the foreground. The motion of an object, as represented by the displacement from one image to the next, may be a short distance in the images. Alternatively or in addition, the camera itself may move to capture a slightly different angle of the object, which gives the appearance of object motion from one image to the next. In some instances, an object may move a longer distance from one image to the next, such as when a car passes in front of the camera. Additionally, an object and/or the camera may rotate while the images are captured, which lends to high-order motions that include rotation motions and similarity, affine, and projective transformations.

In the examples described herein for statistics of nearest neighbor fields, the digital images 106 are referenced as a first image 114 and a second image 116 that illustrate the motion of a dog jumping over an object. For example, in the first image 114, the dog is shown at the height of his jump over the object and, in the second image 116, the motion of the dog is shown to continue finishing the jump. The first and second digital images are described merely for illustrative purposes, and it should be noted that aspects of statistics of nearest neighbor fields can be expanded and applied to any number of digital images.

In embodiments, the image processing application 104 (and/or the algorithms of the image processing application) are described as creating, generating, determining, and/or modifying various digital image data 118 for statistics of nearest neighbor fields. The details of the image processing application and/or algorithms interaction with the various digital image data are described and illustrated in examples of the first and second images 114, 116 with reference to FIGS. 2-4.

Generally, the nearest neighbor field algorithm 108 of the image processing application 104 is implemented to determine matching patches 120 of a nearest neighbor field for the first and second images 114, 116. An example of the matching patches 120 of a nearest neighbor field for the first and second images is described and illustrated with reference to FIGS. 2 and 3. The motion field algorithm 110 of the image processing application 104 is implemented to determine a motion field 122 based on motion data 124 of the matching patches.

The motion optimization algorithm 112 of the image processing application 104 is implemented to determine the predominant motion components 126 of the motion field 122 based on statistics 128 of the motion data 124. Generally, the predominant motion components correspond to the motion of one or more objects as represented by a displacement between the first and second digital images. The motion optimization algorithm 112 is also implemented to assign one of the predominant motion components 126 to each of the matching patches to optimize a final motion field of the matching patches. An example of a motion field with predominant motion components determined based on statistics of the motion data is described and illustrated with reference to FIG. 4.

Figure 2:
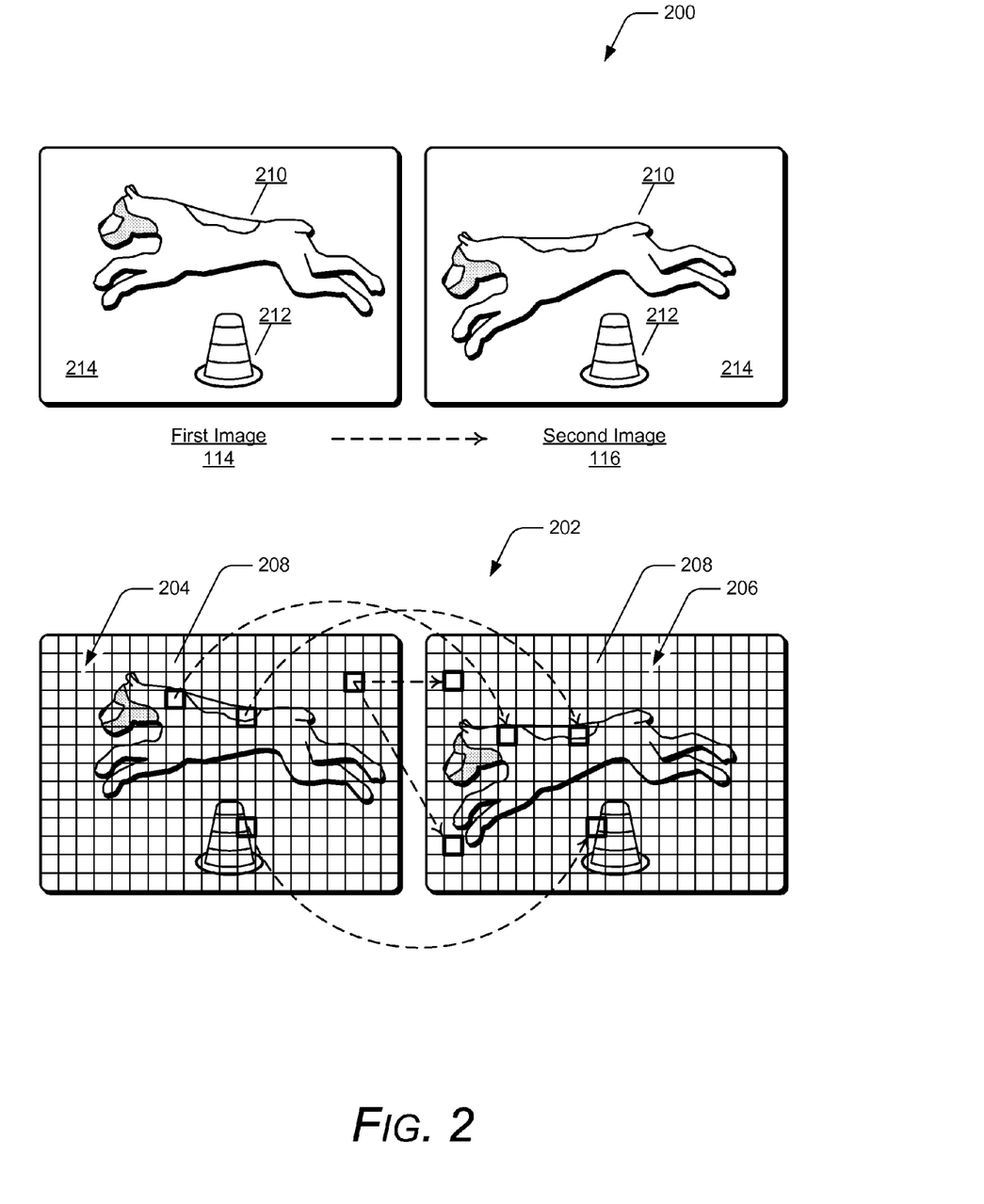
FIG. 2 illustrates an example of initial matching patches of a nearest neighbor field for digital images in accordance with one or more embodiments.

FIG. 2 illustrates an example 200 of matching patches 202 of a nearest neighbor field for the first image 114 and the second image 116 (described with reference to FIG. 1). The image processing application 104 creates an image grid 204 of the first image 114, and creates an image grid 206 of the second image 116. Each block or region of the image grids are representative of image patches 208, which can each be individual pixels, or larger regions that include multiple pixels. The nearest neighbor field algorithm 108 of the image processing application 104 is implemented to compare the image patches in the first image grid 204 and the second image grid 206 to determine the matching patches 202 at the image grid locations of the first and second images.

Patches of a digital image may be considered as each pixel of the image, or may be a larger region of the image that includes a grid of multiple pixels. A patch of several pixels will typically have more colors and other visual characteristics that make the patch less ambiguous, and likely easier to match for spatial coherency between images. The visual characteristics of a patch can include colors, shading, boundaries, and object features that can be detected to match patches for digital images. For example, a mostly black car may move as represented from one image to the next, and although many of the patches in the two images may be matching based on the black color of the car, the physically corresponding, spatially coherent patches may be different than the many other black colored patches due to shading, lighting, and/or other visual variations in the images, boundaries, and object shapes.

A relatively small patch (such as a 3×3 or 5×5 pixel region) can be used to determine object deformations to track object movement from one image to the next. While smaller patches may be better for accurate location determinations, such as for spatial coherency of an image patch from one image to another, larger patches can be utilized to avoid repetitive pattern matching. For example, a background of one common color, a wall, a fence, or other repetitive object pattern in the images will cause matching patches without spatial coherency from one image to the next. Although the smaller matching patches may be an accurate representation of the visual characteristics, the smaller matching patches may not physically correspond from one image to the next. Larger patches are likely to include visual characteristics of the images that are not repetitive, and the additional subject matter can be easier to match in the digital images.

The nearest neighbor field algorithm 108 of the image processing application 104 can be implemented with any number of various algorithms and techniques, including but not limited to, searching for the best matching patch in one image for every corresponding patch in the other image; utilizing a spatial constraint for a more efficient matching speed; and/or implementing the Principal Component Analysis or the Walsh-Hadamard Transform to compress the patches.

Examples of the matching patches 202 are shown in the image grids 204, 206 for the respective first and second images 114, 116. For example, two matching patches on the dog 210 in the second image 116 are matched to respective patches on the dog in the first image 114. Similarly, a matching patch that includes part of the object 212 (e.g., a cone that the dog jumps over) in the second image 116 is matched to a patch in the first image 114. The matching patches of the cone object illustrate that, although matching patches of the first and second images may include the visual subject matter and characteristics of each patch, the matching patches may not physically correspond from one image to the next. For example, the physically corresponding matching patch of the object in the second image 116 is to a patch on the other side of the object in the first image 114.

Additionally, two matching patches of the background 214 in the second image 116 are matched to a single patch in the first image 114. The matching patches of the background illustrate that patches in one image may be initially matched to any number of matching patches in the other image. Further, as with the matching patches of the cone object, the initial matching patches of the background are also not spatially coherent and do not physically correspond in location from one mage to the next.

Figure 3:
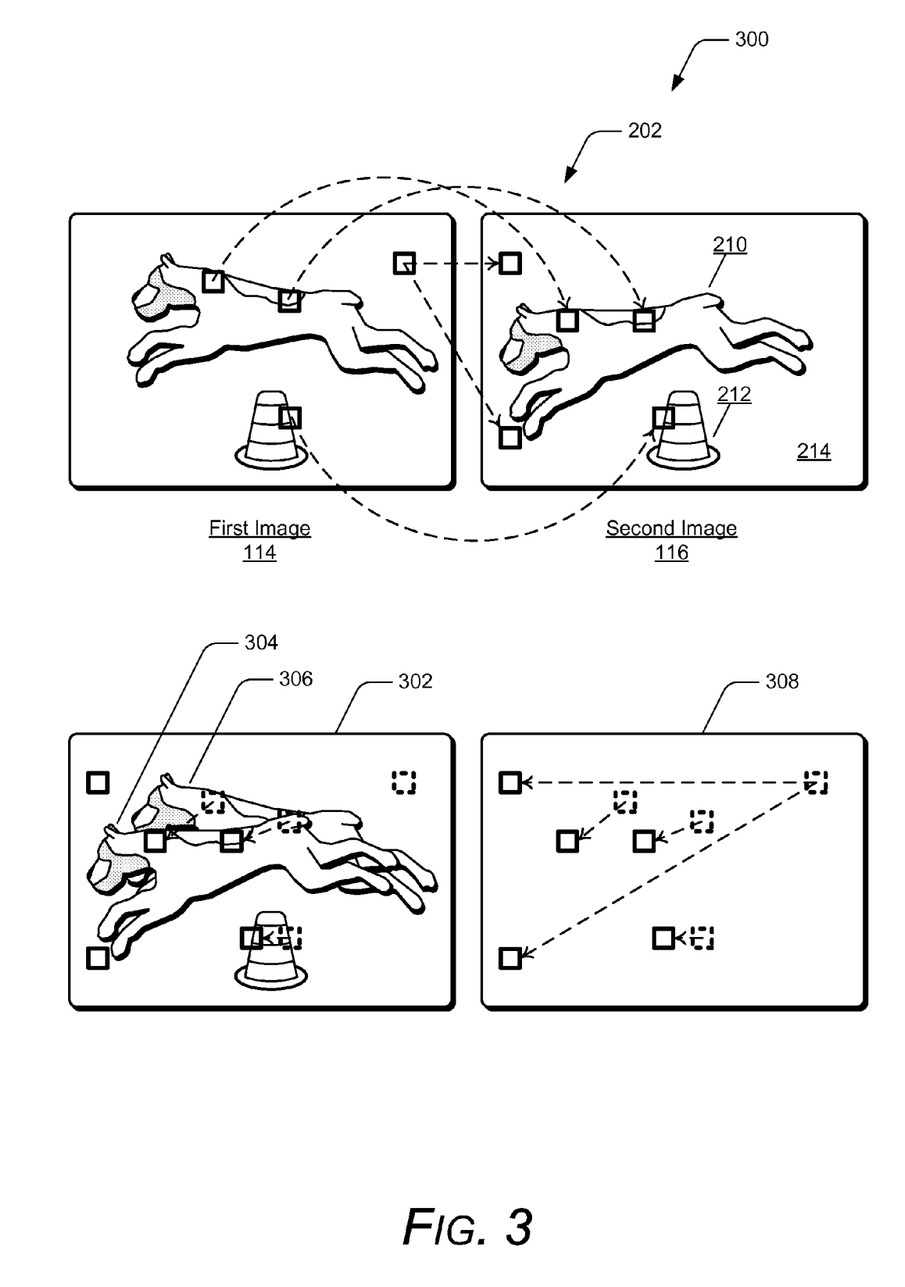
FIG. 3 further illustrates the example of the initial matching patches of a nearest neighbor field in accordance with one or more embodiments.

FIG. 3 further illustrates an example 300 of the matching patches 202 of the nearest neighbor field for the first image 114 and the second image 116, shown for illustrative purposes without the image grids as in FIG. 2. A superimposed image 302 shows the motion position 304 of the dog 210 in the second image 116 relative to the motion position 306 of the dog in the first image 114 to illustrate the displacement of the example matching patches. In the superimposed image 302, the matching patches of the first image 114 are shown as the dashed-line border patches and the matching patches of the second image 116 are shown as the solid-line border patches. Another example superimposed image 308 illustrates the displacement of the example matching patches for the first and second images with the objects (e.g., the dog and the cone) removed from the image. Again, the matching patches of the first image 114 are shown as the dashed-line border patches and the matching patches of the second image 116 are shown as the solid-line border patches.

Figure 4:
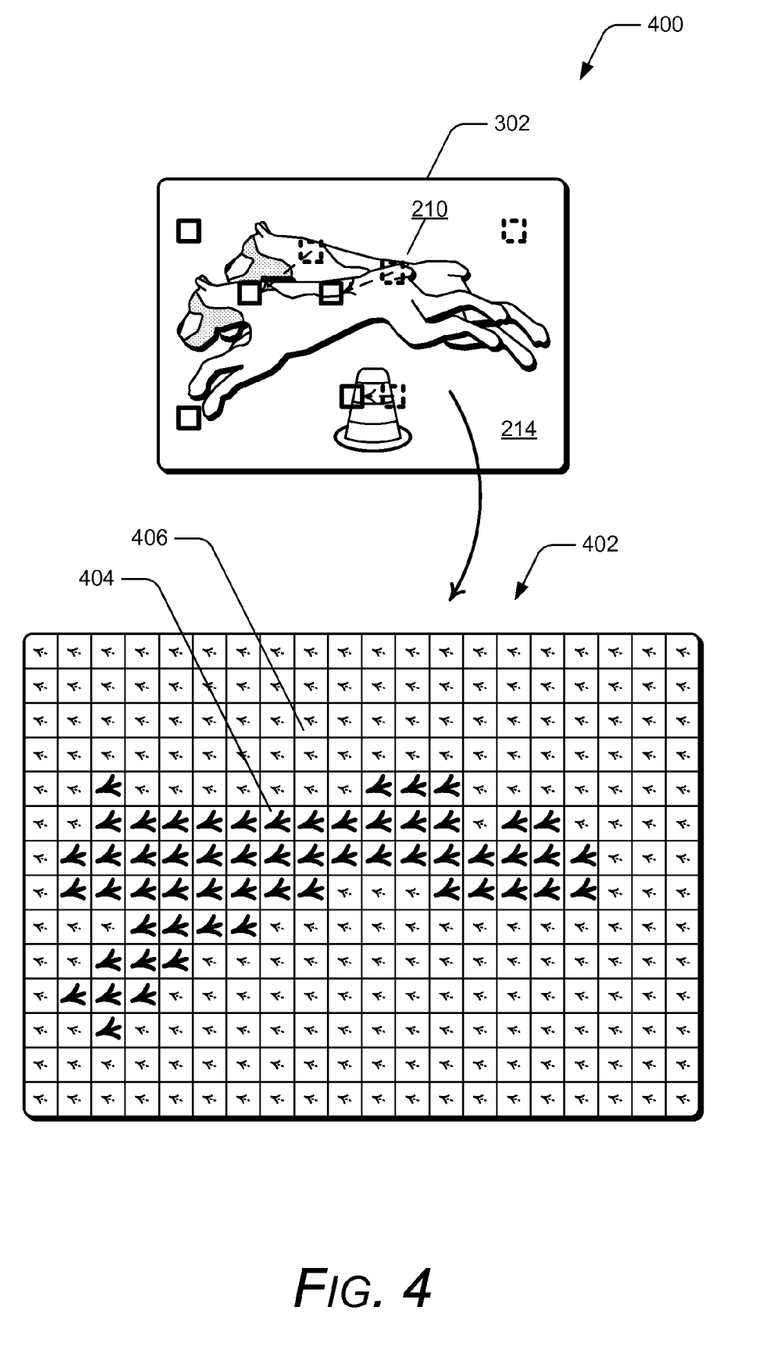
FIG. 4. illustrates an example of a motion field with predominant motion components determined based on statistics of the motion data in accordance with one or more embodiments.

FIG. 4 illustrates an example 400 of a motion field 402 with predominant motion components determined based on statistics of the motion data (and illustrated with reference to the superimposed image 302 also shown in FIG. 3). The motion field algorithm 110 of the image processing application 104 is implemented to determine an initial motion field based on the motion data 124 of the matching patches 120. The motion data includes vectors that define the motion field. For a point $p_o$ on an object that moves with a velocity $v_o$, then the imaged point $p_i$ can be assigned a vector $v_i$ to indicate its 2D translation movement on a plane of an image. The motion field 402 can then be created with the predominant motion components 126 of the initial motion field.

The motion optimization algorithm 112 of the image processing application 104 is implemented to determine the predominant motion components 126 of the motion field 402 based on the statistics 128 of the motion data. A majority, or groups of the matching patches, have similar patch offsets, and for motion between images, the patch offsets can be predictive to determine the predominant motion components of the motion field. The predominant motion components correspond to the motion of the objects as represented by a displacement between the first and second images 114, 116, such as the motion of the dog 210 and the lack of motion of the background 214 as shown in the superimposed image 302.

A predominant motion component may also correspond to a static background or foreground of an image that includes several matching patches having a common lack of motion for a zero motion field. In this example, there are two predominant motion components between the first and second images, specifically the predominant motion component 404 of the dog jumping and the predominant motion component 406 that corresponds to the background of the image. Although only two predominant motion components are described in this example, the algorithms and techniques described for the statistics of nearest neighbor fields may account for several motions that describe objects moving as represented by the displacement from one image to the next.

In implementations, the statistics 128 of the motion data may be represented by a histogram that is computed by the motion optimization algorithm 112, and the histogram is based on all of the motion components in the motion field. The motion optimization algorithm can then select the predominant motion components 126 based on the frequent peaks of the histogram. For example, the motion field statistics can computed by a 2D histogram h(u,v):

$$h(u, v) = \sum_x \delta(s(x) = (u, v))$$

where $\delta(\ldots)$ is one (1) when the argument is true and zero (0) otherwise. The resulting highest peaks of the histogram correspond to the predominant motion components of the motion field.

The motion optimization algorithm 112 may also be implemented to determine the predominant motion components 126 based in part on a projected motion constraint that is representative of projected motion of the objects. Generally, the motion of an object can be projected based on the expected, or natural, flow of motion of the object from one image to the next. The natural motion flow of object motion from one image to the next is generally going to be fairly restricted and determinable. The motion optimization algorithm can also disregard motion data of the matching patches that do not represent the projected motion of the objects from one image to the next.

The motion optimization algorithm 112 may also be implemented to determine scale invariant feature transform (SIFT) features that match between the first and second images 114, 116, and determine the predominant motion components 126 based in part on the matching SIFT features. The SIFT features, or descriptors, can be extracted at each pixel and/or patch of an image to characterize image objects and encode contextual information of the pixels and/or matching patches.

The motion optimization algorithm 112 can also be implemented to determine high-order motion components based on a random sample consensus (RANSAC) algorithm, which is an iterative algorithm to estimate the motion data for multiple predominant motion components. The high-order motion components may have a transformative component of the motion, such as for high-order motions that include rotation motions and similarity, affine, and projective transformations. The predominant motion components 126 can include one or more of the determined high-order motion components as assigned determined by the motion optimization algorithm 112.

In embodiments, the motion optimization algorithm 112 is implemented to assign one of the predominant motion components 126 to each of the matching patches 120 to optimize a final motion field of the matching patches. In implementations, a predominant motion component can be assigned to each of the matching patches based on a multi-label graph-cut optimization. The assigned predominant motion components of the final motion field can be applied for each matching patch in the digital images to generate a physical matching patch correspondence between the two images, and create a spatially coherent nearest neighbor field. The final motion field can be computed by optimizing a cost function with a data term and a smoothness term, where the data term is a patch distance between matching patches at an image grid location of the first and second digital images, and the smoothness term uses a difference in assigned motions for two adjacent patches (e.g., the motions implied by the matches for two neighboring patches).

Example method 500 is described with reference to FIG. 5 in accordance with one or more embodiments of statistics of nearest neighbor fields. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 5:
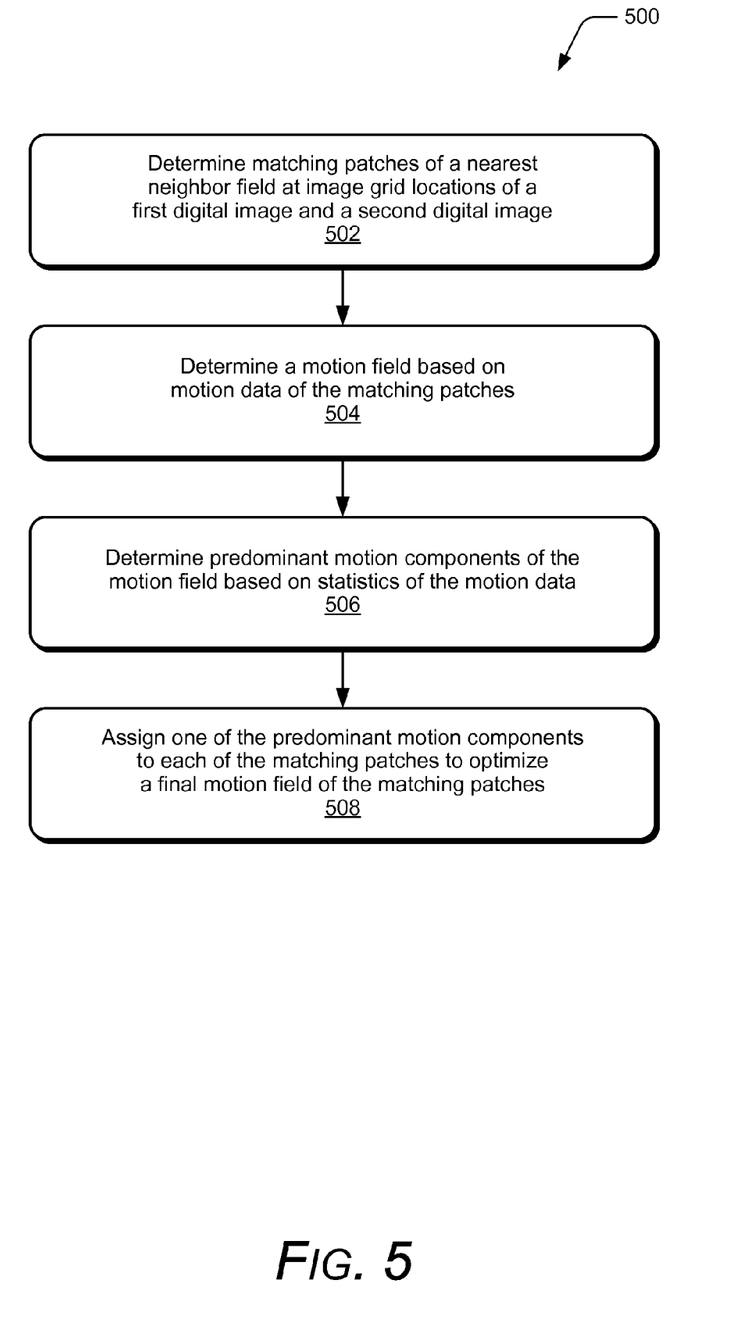
FIG. 5 illustrates example method(s) of statistics of nearest neighbor fields in accordance with one or more embodiments.

FIG. 5 illustrates example method(s) 500 of statistics of nearest neighbor fields, and is generally described with reference to an image processing application. The order in which the method is described is not intended to be construed as a limitation, and any number or combination of the method operations can be combined in any order to implement a method, or an alternate method.

At 502, matching patches are determined for a nearest neighbor field at image grid locations of a first digital image and a second digital image. For example, the nearest neighbor field algorithm 108 of the image processing application 104 at the computing device 102 (FIG. 1) compares image patches in the first image grid 204 and the second image grid 206 (FIG. 2) to determine the matching patches 120 (e.g., of the digital image data 118) and also shown in FIG. 2 as the initial matching patches 202 at the image grid locations of the first and second images 114, 116. Given the two digital images, the image processing application 104 creates the first image grid 204 of the first image 114 and creates the second image grid 206 of the second image 116.

At 504, a motion field is determined based on motion data of the matching patches. For example, the motion field algorithm 110 of the image processing application 104 determines a motion field 122 based on the motion data 124 of the matching patches 120.

At 506, predominant motion components of the motion field are determined based on statistics of the motion data. For example, the motion optimization algorithm 112 of the image processing application 104 determines the predominant motion components 126 of the motion field based on the statistics 128 of the motion data. The predominant motion components can be determined based on the statistics of the motion data of all of the motion components in the motion field, and correspond to a motion of objects as represented by a displacement between the first and second images. The statistics of the motion data can be represented by a histogram that is computed by the motion optimization algorithm 112, and the predominant motion components selected based on frequent peaks of the histogram.

In embodiments, the motion optimization algorithm 112 can determine the predominant motion components of the motion field based in part on a factor of spatial connectivity that corresponds to a spatial relationship between the predominant motion components. The predominant motion components may also be determined based in part on a clustering of the motion components in the motion field. Alternatively or in addition, the predominant motion components may be determined based in part on a projected motion constraint that represents a projected (e.g., expected or natural) motion of the objects between the first and second digital images, and the motion data that does not represent the projected motion of the objects can be disregarded.

In embodiments, scale invariant feature transform (SIFT) features that match between the two digital images can be determined, and the predominant motion components are determined based in part on the matching SIFT features. Additionally, high-order motion components that have a transformative component of the motion can be determined, and the predominant motion components include one or more the high-order motion components. In implementations, a random sample consensus (RANSAC) algorithm may be utilized to determine the high-order motion components, such as rotations and similarity, affine, and projective transformations.

At 508, one of the predominant motion components is assigned to each of the matching patches to optimize a final motion field of the matching patches. For example, the motion optimization algorithm 112 of the image processing application 104 assigns one of the predominant motion components to each of the matching patches to optimize a final motion field of the matching patches. Further, the final motion field is optimized based on minimizing a cost function that includes a data term and a smoothness term. The data term is a patch distance between matching patches at an image grid location of the first and second digital images, and the smoothness term uses a difference in assigned motions for adjacent patches.

Figure 6:
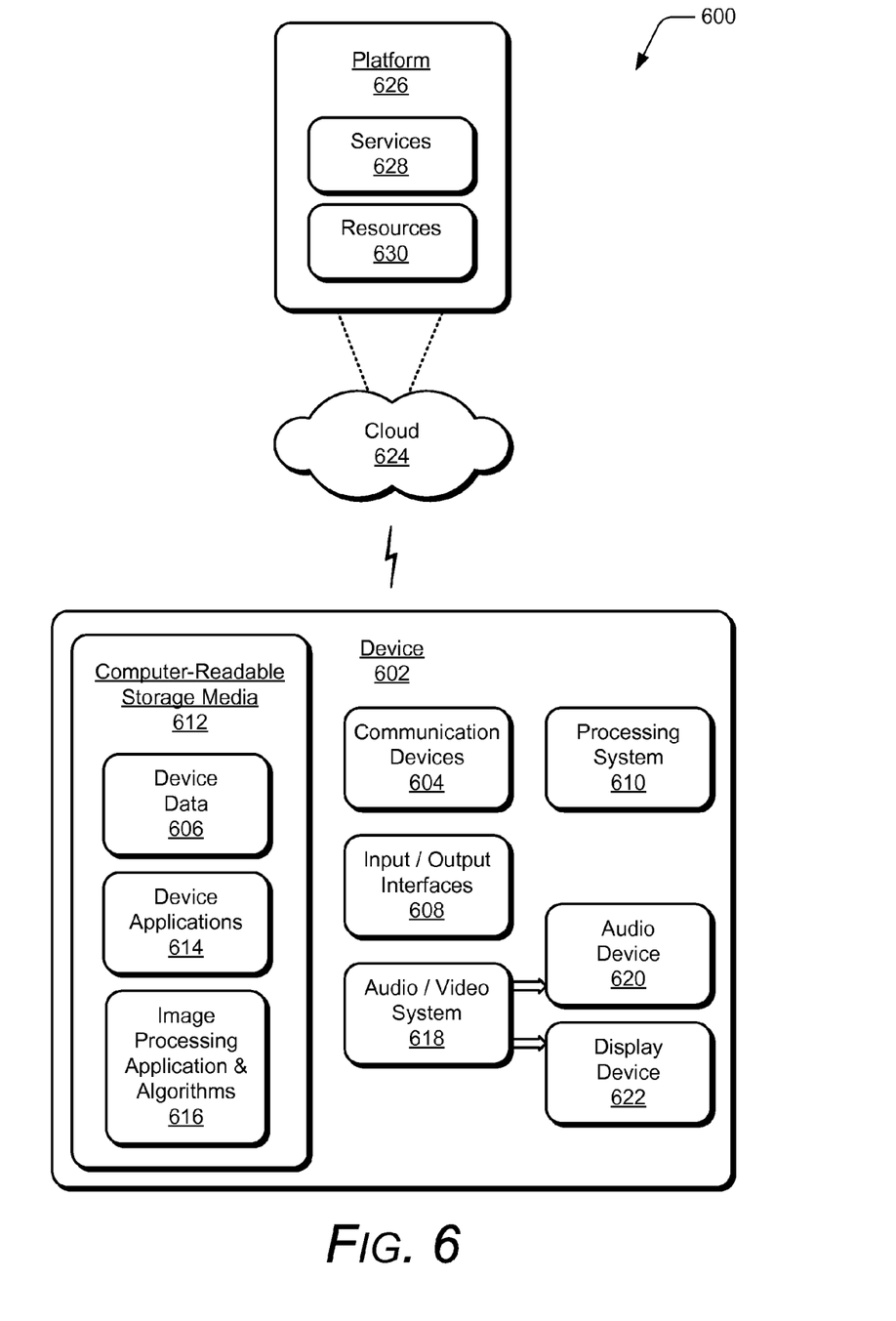
FIG. 6 illustrates an example system with an example device that can implement embodiments of statistics of nearest neighbor fields.

FIG. 6 illustrates an example system 600 that includes an example device 602, which can implement embodiments of statistics of nearest neighbor fields. The example device 602 can be implemented as any of the devices and/or servers described with reference to the previous FIGS. 1-5, such as any type of computer, server, processing device, client device, mobile device, tablet, computing, communication, and/or other type of device. For example, computing device 102 shown in FIG. 1 may be implemented as the example device 602.

The device 602 includes communication devices 604 that enable wired and/or wireless communication of device data 606, such as the digital images and the digital image data that is stored on the device. The communication devices 604 can also include transceivers for cellular phone communication and for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 612, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 612 provides storage of the device data 606 and various device applications 614, such as an operating system that is maintained as a software application with the computer-readable storage media and executed by the processing system 610. In this example, the device applications also include an image processing application and algorithms 616 that implement embodiments of statistics of nearest neighbor fields, such as when the example device 602 is implemented as the computing device 102 shown in FIG. 1. Examples of the image processing application and algorithms 616 are the image processing application 104, the nearest neighbor field algorithm 108, the motion field algorithm 110, and the motion optimization algorithm 112 at the computing device 102, as described with reference to FIGS. 1-5.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device.

In embodiments, at least part of the techniques described for statistics of nearest neighbor fields may be implemented in a distributed system, such as over a "cloud" 624 in a platform 626. The cloud 624 includes and/or is representative of the platform 626 for services 628 and/or resources 630. For example, the services 628 and/or the resources 630 may include any of the image processing application and algorithms 616, as well as the digital images 106 and the digital image data 118 described with reference to FIG. 1.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of statistics of nearest neighbor fields have been described in language specific to features and/or methods, the appended claims are not necessarily limited to the specific features or methods described. Rather, the specific features and methods are disclosed as example implementations of statistics of nearest neighbor fields.

The invention claimed is:

1. A method, comprising:
   determining matching patches of a nearest neighbor field at image grid locations of a first digital image and a second digital image;
   determining a motion field based on motion data of the matching patches;
   determining matching scale invariant feature transform (SIFT) features between the first and second digital images;
   determining high-order motion components that have a transformative component of a motion of one or more objects between the first and second digital images;
   determining predominant motion components of the motion field based on the matching SIFT features, the high-order motion components, and statistics of the motion data to generate a final motion field, the predominant motion components corresponding to the motion of one or more of the objects as represented by a displacement between the first and second digital images; and
   assigning one of the predominant motion components to each of the matching patches to optimize the final motion field of the matching patches.

2. A method as recited in claim 1, wherein determining the predominant motion components is based on the statistics of the motion data of all of the motion components in the motion field.

3. A method as recited in claim 2, further comprising:
   computing a histogram based on the statistics of the motion data; and
   selecting the predominant motion components based on peaks of the histogram.

4. A method as recited in claim 1, wherein determining the predominant motion components is based on a factor of spatial connectivity that corresponds to a spatial relationship between the predominant motion components.

5. A method as recited in claim 1, wherein determining the predominant motion components is based on a clustering of the motion components in the motion field.

6. A method as recited in claim 1, wherein determining the predominant motion components is based on a projected motion constraint that is representative of projected motion of the one or more objects.

7. A method as recited in claim 6, wherein the motion data of the matching patches that do not represent the projected motion of the one or more objects is disregarded.

8. A method as recited in claim 1, further comprising:
   determining the high-order motion components that have the transformative component of the motion based on a random sample consensus (RANSAC) algorithm.

9. A method as recited in claim 1, wherein the predominant motion components include one or more of the high order motion components.

10. A method as recited in claim 1, wherein:
    the final motion field is optimized based on minimizing a cost function that includes a data term and a smoothness term;
    the data term comprises a patch distance between matching patches at an image grid location of the first and second digital images; and
    the smoothness term comprises a difference in assigned motions for adjacent patches.

11. A computing device, comprising:
    a memory configured to maintain digital images;
    a processing system to implement an image processing application that is configured to:
    determine matching patches of a nearest neighbor field between a first digital image and a second digital image;
    determine a motion field based on motion data of the matching patches;
    determine matching scale invariant feature transform (SIFT) features between the first and second digital images;
    determine high-order motion components that have a transformative component of a motion of one or more objects between the first and second digital images;
    determine predominant motion components of the motion field based on statistics of the motion data, the matching SIFT features, and the high-order motion components, the predominant motion components corresponding to the motion of one or more of the objects as represented by a displacement between the first and second digital images; and
    assign one of the predominant motion components to each of the matching patches to optimize a final motion field of the matching patches.

12. A computing device as recited in claim 11, wherein the image processing application is configured to:
    compute a histogram based on the statistics of the motion data of all of the motion components in the motion field; and
    select the predominant motion components based on peaks of the histogram.

13. A computing device as recited in claim 11, wherein the image processing application is configured to:
    determine the predominant motion components based on a projected motion constraint that is representative of projected motion of the one or more objects; and
    disregard motion data of the matching patches that does not represent the projected motion of the one or more objects.

14. A computing device as recited in claim 11, wherein the image processing application is configured to:
    determine the high-order motion components that have the transformative component of the motion based on a random sample consensus (RANSAC) algorithm.

15. A computing device as recited in claim 11, wherein the predominant motion components include one or more of the high order motion components.

16. A computing device as recited in claim 11, wherein the image processing application is configured to assign a predominant motion component to each of the matching patches based on a multi-label graph-cut optimization.

17. A non-transitory computer-readable storage memory device storing algorithms as instructions that are executable and, responsive to execution of the instructions at a computing device, the computing device performs operations of the algorithms comprising to:
    determine matching patches of a nearest neighbor field between a first digital image and a second digital image;
    determine matching scale invariant feature transform (SIFT) features between the first and second digital images;

determine high-order motion components that have a transformative component of a motion of one or more objects between the first and second digital images;

determine predominant motion components of a motion field based on statistics of motion data of the matching patches, the matching SIFT features, and the high-order motion components, the predominant motion components corresponding to the motion of one or more of the objects as represented by a displacement between the first and second digital images; and assign one of the predominant motion components to each of the matching patches to optimize a final motion field of the matching patches.

18. The non-transitory computer-readable storage memory device as recited in claim 17, wherein the computing device performs the operations of the algorithms further comprising to:

compute a histogram based on the statistics of the motion data of all of the motion components in the motion field; and select the predominant motion components based on peaks of the histogram.

19. The non-transitory computer-readable storage memory device as recited in claim 17, wherein the computing device performs the operations of the algorithms further comprising to:

determine the predominant motion components based on a projected motion constraint that is representative of projected motion of the one or more objects; and disregard motion data of the matching patches that does not represent the projected motion of the one or more objects.

20. The non-transitory computer-readable storage memory device as recited in claim 17, wherein the computing device performs the operations of the algorithms further comprising to:

determine the high-order motion components that have the transformative component of the motion based on a random sample consensus (RANSAC) algorithm.

\* \* \* \* \*